US012711088B2

(12) United States Patent
Paul et al.

(10) Patent No.: US 12,711,088 B2
(45) Date of Patent: Aug. 18, 2026

(54) TECHNIQUES TO UTILIZE NEAR MEMORY COMPUTE CIRCUITRY FOR MEMORY-BOUND WORKLOADS

(71) Applicant: Intel Corporation, Santa Clara, CA (US)

(72) Inventors: Somnath Paul, Hillsboro, OR (US); Muhammad M. Khellah, Tigard, OR (US); Nilesh Jain, Portland, OR (US); Gopi Krishna Jha, Bangalore (IN); Ravishankar Iyer, Portland, OR (US); Theodore Willke, Portland, OR (US); Mariano Tepper, Portland, OR (US); Maria Cecilia Aguerrebere Otegui, Sunnyvale, CA (US); Nagabhushan Chitlur, Portland, OR (US); Suresh Thirumandas, Cupertino, CA (US); Ananthan Ayyasamy, Beaverton, OR (US); Sujoy Sen, Beaverton, OR (US); Xiao Hu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 23 days.

(21) Appl. No.: 18/834,582

(22) PCT Filed: Mar. 30, 2022

(86) PCT No.: PCT/CN2022/084023

§ 371 (c)(1),
(2) Date: Jul. 30, 2024

(87) PCT Pub. No.: WO2023/184224

PCT Pub. Date: Oct. 5, 2023

(65) Prior Publication Data

US 2025/0156356 A1 May 15, 2025

(51) Int. Cl.
*G06F 13/40* (2006.01)
*G06F 13/16* (2006.01)

(52) U.S. Cl.
CPC ...... *G06F 13/4022* (2013.01); *G06F 13/1684* (2013.01)

(58) Field of Classification Search
CPC ......................... G06F 13/1684; G06F 13/4022
See application file for complete search history.

(56) References Cited

U.S. PATENT DOCUMENTS 11,182,264 B1 * 11/2021 Sivaramakrishnan .. G06F 9/547
2006/0184711 A1 8/2006 Pettey et al.
(Continued)

FOREIGN PATENT DOCUMENTS

CN 110908600 A 3/2020
CN 113497747 A 10/2021

OTHER PUBLICATIONS

Boutros, A., "Beyond Peak Performance: Comparing The Real Performance of AI-Optimized FPGAs and GPUs", 2020 International Conference on Field-Programmable Technology (ICFPT), IEEE, Dec. 2020, pp. 10-19, 10 pages.
(Continued)

*Primary Examiner* — Henry Tsai
*Assistant Examiner* — Harry Z Wang
(74) *Attorney, Agent, or Firm* — Compass IP Law PC

(57) ABSTRACT

Examples include techniques to utilize near memory compute circuitry for memory-bound workloads. Examples include the near memory compute circuitry being resident on an input/output (I/O) arranged to couple with a plurality of memory devices configured as a memory pool that is accessible to a host central processing unit (CPU) through the I/O switch. The near memory compute circuitry may receive a request to obtain data from the memory pool and
(Continued)

generate a result that is made available to the host CPU to facilitate acceleration of a memory-bound workload.

14 Claims, 11 Drawing Sheets

(56) References Cited

U.S. PATENT DOCUMENTS

| | | | | |
|---|---|---|---|---|
| 2011/0072204 | A1 | 3/2011 | Chang et al. | |
| 2018/0124163 | A1 | 5/2018 | Abali et al. | |
| 2020/0285420 | A1* | 9/2020 | Guim Bernat | G06F 3/0659 |
| 2020/0322287 | A1* | 10/2020 | Connor | H04L 47/125 |
| 2021/0011864 | A1* | 1/2021 | Guim Bernat | G06F 12/0833 |
| 2021/0133990 | A1* | 5/2021 | Eckart | G06T 17/00 |
| 2021/0193196 | A1 | 6/2021 | Augustine et al. | |
| 2021/0311900 | A1* | 10/2021 | Malladi | G06F 13/4022 |
| 2021/0334234 | A1* | 10/2021 | Yudanov | G06F 9/5016 |
| 2023/0176744 | A1* | 6/2023 | Hahn | G06F 3/0616 |

OTHER PUBLICATIONS

Cutress, I., "Compute eXpress Link 2.0 (CXL 2.0) Finalized: Switching, PMEM, Security", AnandTech, Downloaded from: https://www.anandtech.com/show/16227/compute-express-link-cxl-2-0-switching-pmem-security, Nov. 2020, 6 pages.

Danesh, A., "The Benefits of Serial-Attached Memory with Compute Express Link," https://www.computeexpresslink.org/post/the-benefits-of-serial-attached-memory-with-compute-express-link, CXL Consortium, May 25, 2020, 3 pages.

He, M., "Newton: A DRAM-maker's Accelerator-in-Memory (AiM) Architecture for Machine Learning", 2020 53rd Annual IEEE/ACM International Symposium on Microarchitecture (MICRO), Oct. 2020, pp. 372-385, 14 pages.

Hilson, G., "Running over PCIe physical layer makes open interconnect easier to adopt", EETimes, CXL gathers speed with 2.0 spec, Downloaded from: https://www.eetimes.com/cxl-gathers-speed-with-2-0-spec/, Jan. 25, 2021, 5 pages.

International Search Report and Written Opinion for PCT Patent Application No. PCT/CN22/84023, Mailed Dec. 23, 2022, 9 pages.

Ke, L., "RecNMP: Accelerating Personalized Recommendation with Near-Memory Processing," 2020 ACM/IEEE 47th Annual International Symposium on Computer Architecture (ISCA), May 2020, 14 pages.

Kwon, Y., "A 20nm 6GB Function-In-Memory DRAM, Based on HBM2 with a 1.2TFLOPS Programmable Computing Unit Using Bank-Level Parallelism, for Machine Learning Applications", in Proc. 2021 IEEE International Solid-State Circuits Conference, Feb. 2021, pp. 350-352, 3 pages.

Kwon, Y., "TensorDIMM: A Practical Near-Memory Processing Architecture for Embeddings and Tensor Operations in Deep Learning", MICRO '52: Proceedings of the 52nd Annual IEEE/ACM International Symposium on Microarchitecture, Oct. 2019, 14 pages.

Meinerzhagen, P., "An Energy-Efficient Graphics Processor in 14-nm Tri-Gate CMOS Featuring Integrated Voltage Regulators for Fine-Grain DVFS, Retentive Sleep, and VMIN Optimization", in IEEE Journal of Solid-State Circuits, vol. 54, No. 1, Jan. 2019, pp. 144-157, 14 pages.

Nori, A., "REDUCT: Keep It Close, Keep It Cool! Efficient Scaling of DNN Inference on Multi-core CPUs with Near-Cache Compute", 2021 ACM/IEEE 48th Annual International Symposium on Computer Architecture (ISCA), Jun. 2021, pp. 167-180, 14 pages.

Ruggles, G., "Emerging Applications of CXL", Synopsys, DesignWare IP, Downloaded from: https://www.synopsys.com/designware-ip/technical-bulletin/emerging-applications-cxl.html, Oct. 2020, 11 pages.

Su, C., "HpMC: An Energy-aware Management System of Multi-level Memory Architectures," Proceedings of the First ACM International Symposium on Memory Systems, Oct. 2015, 13 pages.

* cited by examiner

Result Packet Format 400

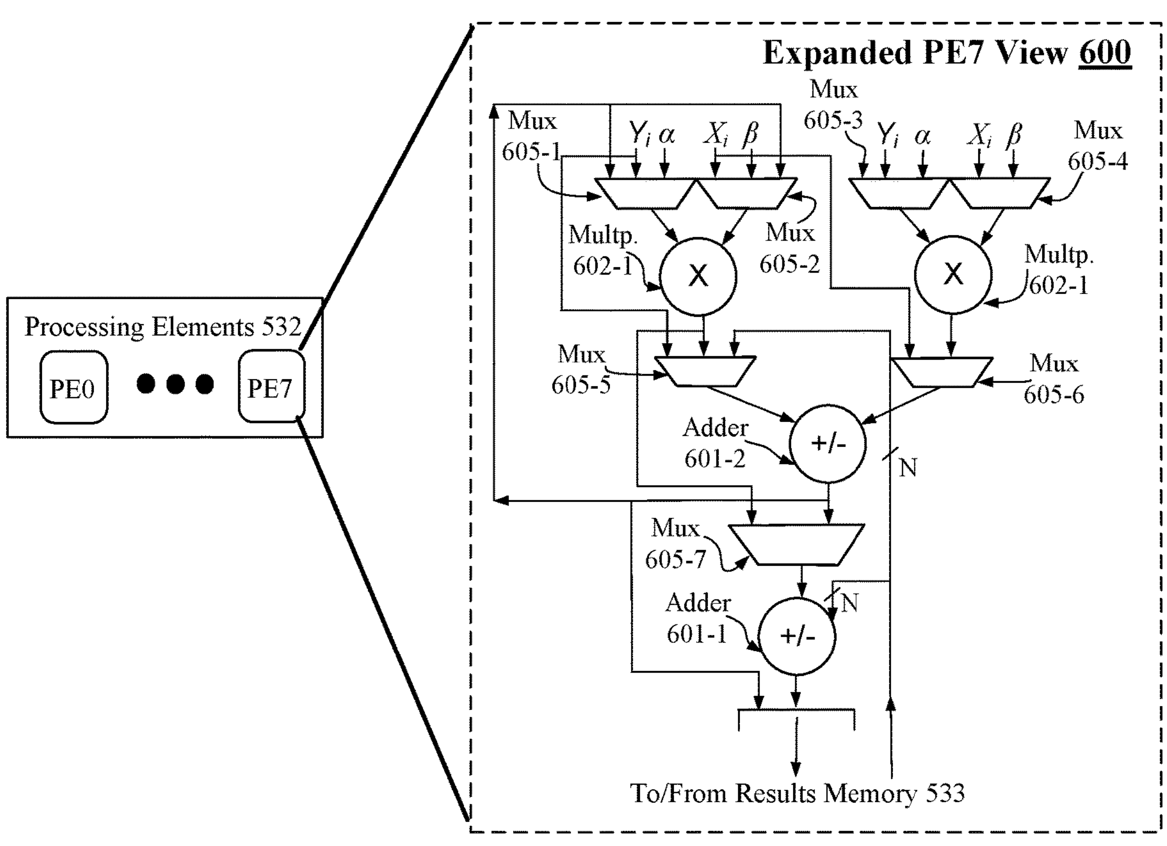

Vector Operations Table 610

| Domain | Function | Description |
|---|---|---|
| Vector Aggregation | $Z_i = Z_i + \alpha X_i + \beta Y_i$ | Weighted Sum |
| | $Z_i = Z_i + X_iY_i,\ Z_j = Z_j + X_jY_j$ | Elementwise Product |
| Search | $Z = Z + (X_i - Y_i)(X_i - Y_i)$ | L2 Distance |
| | $Z = Z + X_iY_i + X_iY_i$ | Vector Dot Product |
| | $Z = Z + X_i - Y_i$ | Manhattan Distance |
| Matrix-Vector Multiplication | $Z_i = Z_i + X_iY_i, Z_j = Z_j = X_jY_j$ | Outer-product with elementwise multiplication |

*FIG. 6*

*Storage Medium 1100*

*Computer Executable Instructions for 1000*

*FIG. 11*

TECHNIQUES TO UTILIZE NEAR MEMORY COMPUTE CIRCUITRY FOR MEMORY-BOUND WORKLOADS

CLAIM OF PRIORITY

This application is a U.S. National Phase application under 35 U.S.C. § 371 of International Application No. PCT/CN2022/084023 filed Mar. 30, 2022. The entire contents of which are incorporated herein by reference.

TECHNICAL FIELD

Examples described herein are related to near memory compute for acceleration of memory-bound workloads that include artificial intelligence (AI) workloads.

BACKGROUND

Performance of workloads executed by a compute system such as search workloads and/or emerging AI workloads including recommendation, graph neural network (GNN), or transformer workloads may be bounded by available memory capacity and bandwidth. A data footprint for such types of workloads may be exceptionally large (e.g., 100 gigabytes (GB) to several terabytes (TBs)) and memory access patterns typically show limited spatial-temporal locality for effective use of on-die or on-chip caching for processing units executing these types of workloads.

BRIEF DESCRIPTION OF THE DRAWINGS

FIG. 6 illustrates an example expanded view of a processing element and a vector operations table.

FIG. 11 illustrates an example of a storage medium.

DETAILED DESCRIPTION

Figure 1:
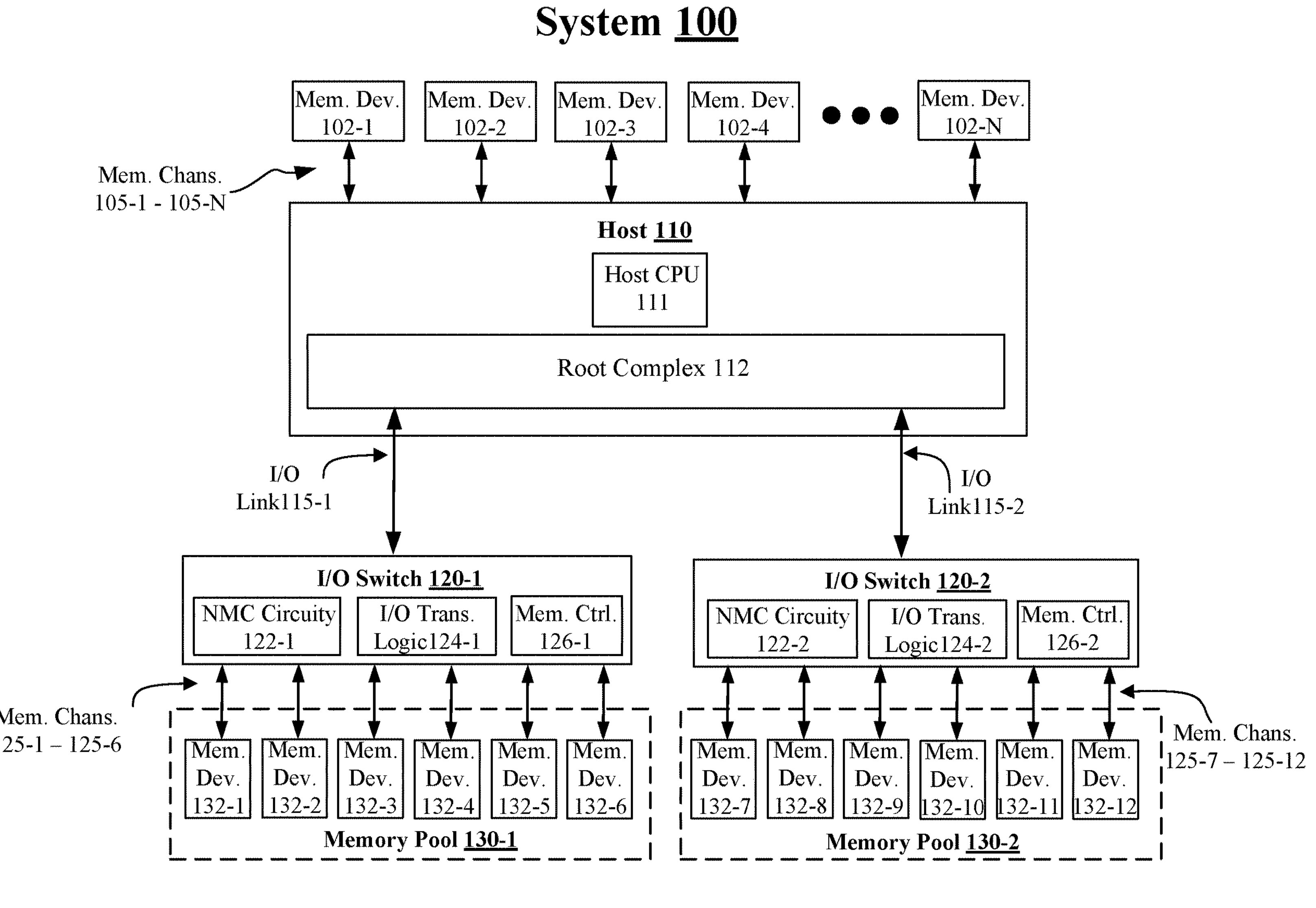
FIG. 1 illustrates an example first system.

Prior solutions to address issues associated with AI workloads being bounded by available memory capacity and bandwidth may not effectively address scalability related to large data sets associated with types of AI workloads executed by a compute system. Other solutions may lack re-usability of existing compute system components and require development and/or use of custom memory solutions to address limited spatial-temporal locality for data used or consumed while executing AI workloads. A first example solution proposes use of near-cache compute to improve AI workload performance for types of AI workloads such as a convolutional neural networks (CNNs). The near-cache compute solution places a tensor functional unit (TFU) near L2 and L3 caches to exploit idle cache bandwidth to improve CNN workload performance where compute and memory-bound phases of the CNN workload may overlap. A second example solution proposes a custom processing-in-memory solution that incorporates a programmable matrix compute engine on a same die as high bandwidth memory (HBM). Although, for this other solution, the memory capacity may be reduced, on-die compute exploits higher possible bandwidth associated with parallel on-die HBM arrays to possibly deliver higher performance for memory-bound AI workloads as compared to traditional AI workload execution that uses HBM as only an attached/off-die memory device. A third example solution attempts to address scalability issues for large databases by proposing to include a compute engine on a double data rate (DDR) dual in-line memory module (DIMM). Typically, DDR types of memories have higher capacities compared to HBM types of memories and these higher capacities may allow the third example solution to scale with data size.

The first example solution mentioned above may only apply to those memory-bound AI workloads whose data footprint fits in on-chip caches that are typically limited to a few hundred megabytes (MBs). The second example solution that utilizes a custom-HBM on-die solution sacrifices memory capacity in order to gain energy-efficiency for memory-bound kernels. This, however, may inadvertently negatively impact other workloads that may require much larger memory capacities than available using on-die HBM arrays and these other workloads may not be able to adequately exploit processing-in-memory compute units. Also, for this second example solution, reliability challenges may arise due to thermal, droop effects that may arise from processing-in-memory compute units. The third example solution that has a compute engine on a DDR DIMM may not include adequate error correction control (ECC). Adequate ECC for large data sets is essential for reliably reading/writing these large data sets to DDR types of memory. ECC for larger data sets that has a capability to correct multiple bit errors is typically executed by a memory controller that is not located on a DDR DIMM. Also, the third example solution incorporates compute at a DDR bank level which can lead to capacity and reliability issues.

A new technical specification by the Compute Express Link (CXL) Consortium is the Compute Express Link Specification, Rev. 2.0, Ver. 1.0, published Oct. 26, 2020, hereinafter referred to as "the CXL specification". The CXL specification introduced the on-lining and off-lining of memory attached to a host computing device (e.g., a server) through one or more memory devices coupled with the host computing device via a type of input/output (I/O) switch configured to operate in accordance with the CXL specification, hereinafter referred to as a "CXL switch". The on-lining and off-lining of memory attached to the host computing device through one or more CXL switches is typically for, but not limited to, the purpose of memory pooling of the memory attached to the host computing device via I/O transaction links, hereinafter referred to as "CXL" links". Memory devices attached through CXL switches and CXL links are hereinafter referred to as CXL-attached memories.

In contrast to the three example solutions mentioned above, higher off-chip memory bandwidth may be present at a system level across multiple CXL-attached memories. Therefore, as described more below, programmable compute logic or circuitry is not pushed into individual DIMMs, rather programmable compute circuitry may be distributed across one or more I/O switches such as CXL switches coupled with memories attached to a host computing devices (e.g., CXL-attached memories) to result in better performance in a scale-up model as compared to the three example solutions mentioned above. As contemplated by this disclosure and described more below, having programmable compute circuitry distributed across one or more CXL switches may not affect memory capacity. Also, the compute circuitry may sit behind a standard memory controller in a data path between the programmable compute circuitry and the CXL-attached memories. Hence, the standard memory controller may be configured to manage ECC and other data reliability tasks. Also, programmable compute circuitry at the CXL switch allows for a leveraging of heterogeneous memory technologies that allow for a best “bandwidth×capacity/cost” trade-off which the above-mentioned solutions may not provide. Programmable compute circuitry at a CXL switch may capture basic compute primitives from multiple memory-bound kernels associated with AI workloads and may be optimized for multiple types of AI workloads. The programmable compute circuitry is hereinafter referred to a “near-memory compute (NMC) circuitry” rather than being in-memory compute circuitry. Hence, NMC circuitry does not directly compare with in-memory compute approaches, which are typically analog, suffer from process, voltage, temperature (PVT) variations and are thus less reliable for high-volume manufacturing and also sacrifice memory capacity.

FIG. 1 illustrates an example system 100. In some examples, as shown in FIG. 1, system 100 includes host 110 that has a root complex 112 to couple with an I/O switch 120-1 and an I/O switch 120-2 via respective I/O transaction links 115-1 and 115-2. Host 110, as shown in FIG. 1, also couples with memory devices 102-1 to 102-N, where “N” represents any whole, positive integer greater than 4, via memory channels 105-1 to 105-N. For these examples, host 110 includes, but is not limited to, a host central processing unit (CPU) 111 to execute one or more workloads. Host CPU 111 may include various commercially available CPUs or processors, including without limitation, processors from Intel® AMD®, Nvidia®, Qualcomm®, ARM®, IBM®, Samsung® or other designers or manufactures of CPUs or processors.

In some examples, the one or more workloads to be executed by host CPU 111 may include, but are not limited to AI workloads. Example AI workloads to be executed by host CPU 111 may include, but are not limited to, graph-based similar search AI workloads such as hierarchical navigable small worlds (HNSW), recommendation system workloads such as deep learning recommendation model (DLRM) workloads, graph neural networks (GNNs) workloads, or low-batch matrix-matrix multiplication workloads.

According to some examples, as shown in FIG. 1, I/O switch 120-1 couples with memory devices 132-1 to 132-6 included in a memory pool 130-1 and switch 120-2 couples with memory device 132-7 to 132-12 included in a memory pool 130-2. Examples are not limited to 2 memory pools and each memory pool is not limited to 6 memory devices. Memory pools of greater or less than 2 having greater or less than 6 memory devices are contemplated by this disclosure. As described in more detail below, NMC circuitry 122-1/2, I/O transaction logic 124-1/2 and memory controllers 126-1/2 may be configured to facilitate a gathering and aggregation of data associated with memory-bound AI workloads to be executed by host CPU 111 in order to accelerate the memory-bound AI workloads for the host CPU. For example, data stored in memory devices included in memory pool 130-1 coupled with I/O switch 120-1 may be accessed through memory controller 126-1 and gathered and then aggregated (reduced) by NMC circuitry 122-1 before I/O transaction logic 124-1 forwards results or indications of where results may be stored to host CPU 111 via a root complex 112. Memory-bound AI workloads such as HNSW, DLRM, GNN or low-batch matrix-matrix multiplication may have a property where output data volume is orders of magnitude smaller than input data volume. Input data for a memory-bound AI workload may be a database (e.g., search database for HNSW), embedding table (e.g., for DLRM or GNN), or a deep neural network (DNN) model (e.g., transformers). The input data, for example, may be primarily stored in one or more memory devices included in memory pool 130-1. Only a fraction of highly-reused portions of that input data is gathered for storage at on-chip memory (not shown) maintained by NMC circuitry 122-1.

In some examples, AI workloads such as DLRM or GNN workloads may have multiple data embeddings or feature vectors as input data that may be read from one or more memory devices included in memory pool 130-1 and/or 130-2. For example, logic and/or features of NMC circuitry 120-1 may read multiple data embeddings or feature vectors to aggregate this type of input data and then reduce the aggregated input data via a pooling operation executed by processing elements included in NMC circuitry 120-1 (not shown in FIG. 1). The pooling operation, for example, may be a mean/max/min pooling operation. Also, for types of AI workloads associated with search, such as HNSW, execution of these types of AI workloads involves distance calculations between query vectors and a large volume of labeled database vectors (e.g., maintained in memory pool 130-1 and/or 130-2). Also, low-batch matrix-matrix multiplication types of AI workloads may be expressed as an out product between vectors read from one or memory devices included in memory pool 13-1 and/or 130-2 and vectors from the low-batch matrix. A closer look at compute operations across the above-mentioned types of AI workloads leads to a common feature that is elementwise (for each element or feature or dimension in the vectors) addition and multiplication. Thus, it is possible to design a unified programmable data path architecture for NMC circuitry such as NMC circuitry 120-1 or NMC circuitry 120-2 that may be capable of catering to the acceleration of the above-mentioned types of AI workloads. This unified data path architecture is described in more detail below.

According to some examples, elements of system 100 may be configured to operate in accordance with the CXL specification. CXL has emerged as an industry standard of choice for communications between a host CPU and external accelerator devices and/or external memory devices via a CXL switch. CXL transaction links coupling the host CPU to external accelerator devices and/or external memory devices (e.g., I/O links 115-1 or 115-2) share a same physical interface (PHY) as transaction links configured to operate according to the Peripheral Component Interconnect Express version 5.0 (PCIe 5.0) specification but have innovations for lower latency compared to PCIe 5.0. An important implementation of CXL is for memory expansion and pooling through a CXL switch. The expansion and pooling of memory through a CXL switch may increase system memory bandwidth for a host CPU without needing to increase pin counts of a CPU for coupling with a large number of memory channels routed to attached memory devices. Also, as described more below, NMC circuitry (e.g., NMC circuitry 122) may be able to gather, aggregate and reduce data to significantly lower an amount of data moved through a system that includes memory pools such as system 100 shown in FIG. 1. In some instances, memory-bound AI workloads may benefit from this lowering in the amount of data moved through the system. In some examples, I/O links 115-1 or 115-1 may serve as CXL transaction links that may utilize various CXL protocols including CXL.mem, CLX.io or CLX.cache protocols to facilitate communications between elements of I/O switches 120-1/2 and memory devices 132-1 to 132-12 or between I/O switches 120-1/2 and Host CPU 111 through root complex 112 to enable the lowering of the amount of data moved through system 100.

According to some examples, memory devices included in memory devices 102-1 to 102-N or memory devices 132-1 to 132-12 may include volatile and/or non-volatile types of memory. In some examples, memory devices 102-1 to 102-N or memory devices 132-1 to 132-12 may include one or more dual in-line memory modules (DIMMs) that may include any combination of volatile or non-volatile memory. For these examples, memory channels 105-1-105-N or 125-1 to 125-12, memory devices 102-1 to 102-N, and memory devices 132-1 to 132-12 may operate in compliance with a number of memory technologies described in various standards or specifications, such as DDR3 (DDR version 3), originally released by JEDEC (Joint Electronic Device Engineering Council) on Jun. 27, 2007, DDR4 (DDR version 4), originally published in September 2012, DDR5 (DDR version 5), originally published in July 2020, LPDDR3 (Low Power DDR version 3), JESD209-3B, originally published in August 2013, LPDDR4 (LPDDR version 4), JESD209-4, originally published in August 2014, LPDDR5 (LPDDR version 5, JESD209-5A, originally published by in January 2020), WIO2 (Wide Input/output version 2), JESD229-2 originally published in August 2014, HBM (High Bandwidth Memory), JESD235, originally published in October 2013, HBM2 (HBM version 2), JESD235C, originally published in January 2020, or HBM3, JESD238, originally published in January 2022, or others or combinations of memory technologies, and technologies based on derivatives or extensions of such specifications. The JEDEC standards or specifications are available at www.jedec.org.

As mentioned above, memory devices included in memory devices 102-1 to 102-N or memory devices 132-1 to 132-12 may include volatile or non-volatile types of memory. Volatile types of memory may include, but are not limited to, random-access memory (RAM), Dynamic RAM (DRAM), DDR synchronous dynamic RAM (DDR SDRAM), GDDR, HBM, static random-access memory (SRAM), thyristor RAM (T-RAM) or zero-capacitor RAM (Z-RAM). Non-volatile memory may include byte or block addressable types of non-volatile memory having a 3-dimensional (3-D) cross-point memory structure that includes, but is not limited to, chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), anti-ferroelectric memory, resistive memory including a metal oxide base, an oxygen vacancy base and a conductive bridge random access memory (CB-RAM), a spintronic magnetic junction memory, a magnetic tunneling junction (MTJ) memory, a domain wall (DW) and spin orbit transfer (SOT) memory, a thyristor based memory, a magnetoresistive random access memory (MRAM) that incorporates memristor technology, spin transfer torque MRAM (STT-MRAM), or a combination of any of the above.

According to some examples, system 100 may be included in a computing device that may be, for example, user equipment, a computer, a personal computer (PC), a desktop computer, a laptop computer, a notebook computer, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof.

Figure 2:
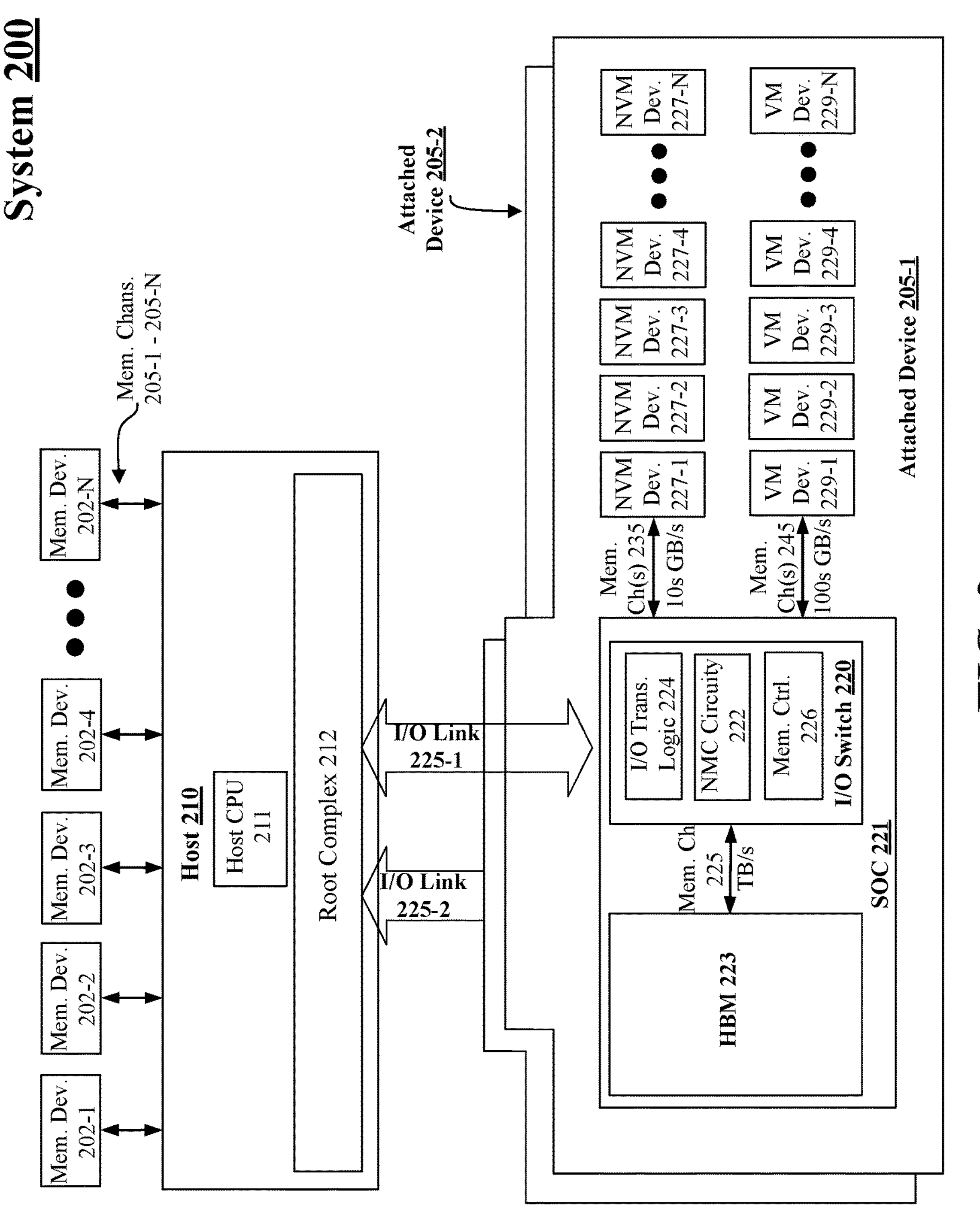
FIG. 2 illustrates an example second system.

FIG. 2 illustrates example system 200. In some examples, as shown in FIG. 2, system 200 includes host 210 that has a root complex 212 to couple with multiple attached devices to include, but not limited to attached devices 205-1 and 205-2 via respective I/O transaction links 225-1 and 225-2. Host 210, as shown in FIG. 2, may also couple with memory devices 202-1 to 202-N via respective memory channels 205-1 to 205-N. For these examples, host 210 includes, but is not limited to, a host CPU 211 to execute one or more workloads (e.g., AI workloads).

According to some examples, as shown in FIG. 2, attached device 205-1 that includes a system-on-a-chip (SOC) 221. For these examples, SOC 221 includes an I/O switch 220 to couple with heterogenous types of memory such as, but not limited to high bandwidth memory (HBM) 223 via a memory channel 225, non-volatile memory (NVM) devices 227-1 to 227-N via memory channel(s) 235, and volatile memory (VM) devices 229-1 to 229-N via memory channel(s) 245. I/O switch 220, as shown in FIG. 2, includes an I/O transaction logic 224, NMC circuitry 222 and memory controller(s) 226. In some examples, I/O transaction logic 224, NMC circuitry 222 and memory controller(s) 226 may operate in a similar manner as described above for I/O transaction logic 124, NMC circuitry 122 and memory controller 226 with the exception of being co-located on a same chip or die as a type of HBM memory device depicted in FIG. 2 as HBM 223.

In some examples, HBM 223, NVM devices 227-1 to 227-N and VM devices 229-1 to 229-N may be arranged in a same or different memory pool. For example, if in a same memory pool, NMC circuitry 222 may use a single memory controller 226 to gather data. The gathered data may be associated with memory-bound AI workloads to be executed by host CPU 211 for which NMC circuitry 222 is to provide reduced data results to facilitate or accelerate execution of the memory-bound AI workloads. Alternatively, if HBM 223, NVM devices 227-1 to 227-N and VM devices 229-1 to 229-N are located in different memory pools, NMC circuitry 222 may use multiple memory controllers included in memory controller(s) 226. For example, a first memory controller may be used to access HBM 223 via memory channel 225, a second memory controller may be used to access NVM devices 227-1 to 227-N via memory channels 235 and a third memory controller may be used to access VM devices 229-1 to 229-N via memory channels 245. In yet another alternative, HBM 223, NVM devices 227-1 to 227-N and VM devices 229-1 to 229-N may be included in a same memory pool, but are accessed via respective first, second and third memory controllers. Also, as shown in FIG. 2, the memory channels to couple with the various types of memory devices may have varying memory bandwidth capacities. For example, memory channel 225 to HBM 223 has a memory bandwidth over a terabyte per second (TB/s), memory channel(s) 245 to VM devices 229-1 to 229-N has a memory bandwidth in the 100*s* of gigabytes per second (GB/s) and memory channel(s) 235 to NVM devices 227-1 to 227-N has a memory bandwidth in the 10*s* of GB/s. Examples are not limited to just these example memory bandwidths and the example memory bandwidths are mentioned to indicate that a balance between memory bandwidth, memory capacity and cost of memory may be struck to determine how the various types of memory may be arranged on an attached device such as attached device 205-1.

According to some examples, similar to system 100, elements of system 200 may be configured to operate according to the CXL specification. For these examples, I/O links 225-1 and 225-1 may serve as CXL transaction links that may utilize various CXL protocols including CXL.mem, CLX.io or CLX.cache protocols to facilitate communications between elements of I/O switch 220 and host CPU 211 through root complex 212 and enable NMC circuitry 222 to gather, aggregate and reduce data associated with memory-bound AI workloads to be executed by host CPU 211 for which NMC circuitry 222 is to provide reduced data results for host CPU 211 to accelerate execution of memory-bound AI workloads. In some examples, CXL.mem protocols may also be used to access the data associated with the memory-bound AI workloads via memory channels 225, 235 or 245.

Figure 3:
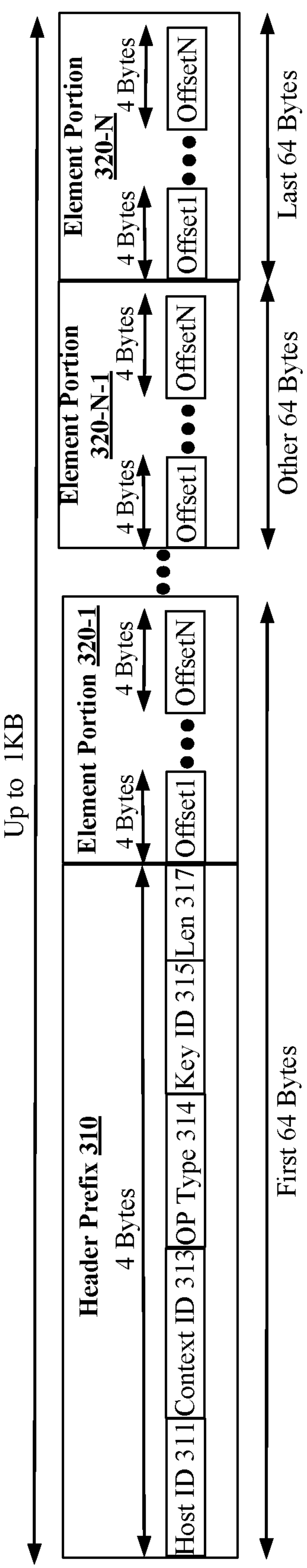
FIG. 3 illustrates an example command packet format.

FIG. 3 illustrates an example command packet format 300. According to some examples, command packet format 300 may enable NMC circuitry of a CXL switch (e.g., NMC 122-1 of I/O switch 120-1) to communicate with a host CPU (e.g., host CPU 111). The command packet, for example, may be transmitted via an I/O transaction link coupling the CXL switch with the host CPU (e.g., I/O transaction link 115-1). For these examples, as shown in FIG. 3, command packet format 300 may be capable of holding 1 kilobyte (KB) of information, examples are not limited to 1 KB of information. Also, as shown in FIG. 3, command packet format 300 includes a header prefix 310 and element portions 320-1 to 320-N.

In some examples, as shown in FIG. 3, header prefix 310 may include 4 bytes of information that includes a host identifier (ID) 311 field, a context ID 313 field, an operation (OP) type 314 field, a key ID 315 field and a length (Len) 317 field. For these examples, host ID 311 may include information to identify a host CPU that generated a command packet to be sent to NMC circuitry (e.g., a unique identifier). OP type 314 may indicate a type of operation to be performed by the NMC circuitry. The type of operation may include, but is not limited to, a search operation, an aggregation/recommendation operation or a matrix-vector multiplication operation. Context ID 313 may indicate a query if OP type 314 indicates a search operation Context ID 313 may indicate an element in a batch, if OP type 314 indicates an aggregation/recommendation operation. Context ID 313 may indicate a vertex ID for another type of aggregation/recommendation related to GNN. Context ID 313 may indicate elements in a vector/low-batch matrix for a matrix-vector multiplication operation. Key ID 315 may include information for picking a pre-programmed key that may be used to decrypt data read from a memory device (e.g., from among memory devices 132). Len 317 may indicate a number of elements included in element portions 320 to follow header prefix 310.

According to some examples, as shown in FIG. 3, each element portion 320 includes multiple 4 byte elements. The first element portion, shown in FIG. 3 as element portion 320-1 may include 60 bytes of elements and element portions 320 may each include a total of 64 bytes (e.g., 16×4 byte) elements. Elements included in element portions 320 may be, for example, a neighbor ID in a graph (e.g., for operations related to HNSW or GNN AI workloads), an offset in case of an embedding table (e.g., for operations related to DLRM), or a value of a vector/matrix element (e.g., for operations related to a matrix-vector multiplication).

In some examples, NMC circuitry may be responsible for decoding a header prefix such as header prefix 310 for a command packet in the example command packet format 300 and then act upon each element included in element portions of the command packet as suggested by the type of operation decoded from the header prefix. For example, neighbor IDs and offsets may be added to a base-address (e.g., maintained in a register accessible to NMC circuitry) to retrieve an actual memory address from which data needs to be fetched from a memory device (e.g., among memory devices 132). For this example, if a feature vector of each neighbor is indicated by vector_len, if the neighbor ID is nid, and the base address is baddr, then the NMC circuitry may issue read requests to the memory addresses in the range "baddr+nid" to "baddr+nid+vector_len−1" in order to fetch a vector_len number of cache lines from the memory device.

Figure 4:
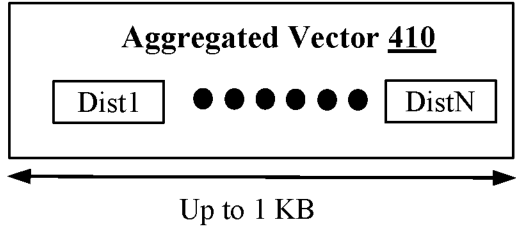
FIG. 4 illustrates an example result packet format.

FIG. 4 illustrates an example result packet format 400. In some examples, result packet format 400 may include information associated with operations completed by NMC circuitry (e.g., NMC circuitry 122-1) responsive to a command packet sent from a host CPU (e.g., host CPU 111). For these examples, results included in aggregated vector 410 in result packet format 400 may be 4 bytes or 8 bytes wide. As shown in FIG. 4, for an example similarity search operation, the results included in aggregated vector 410 may indicate distance values between query vectors and feature vectors. For an operation related to DLRM or GNN workloads, the results may indicate a result vector which is a result of aggregation of multiple vectors read from a memory device (not shown in FIG. 4). For a matrix-vector multiplication operation the results may include the output for the matrix-vector multiplication operation (not shown in FIG. 4).

According to some examples, communication between NMC circuitry and the host CPU may utilize CXL.io protocols according to the CXL specification. For these examples, once the NMC circuitry finishes processing a command packet from the host CPU, the NMC circuitry may write a result into its own internal/local (e.g., on-chip) memory and issue an interrupt to the host CPU. The host CPU may then be capable of reading the results from this internal memory. If communications between the NMC circuitry and the host CPU can utilize CXL.cache protocols according to the CXL specification, the NMC circuitry may be capable of writing results to a host memory space of the host CPU (separate from memory included in attached memory devices) and provide a notification of this writing of results to the host CPU. If communications between NMC circuitry and the host CPU can utilize CXL.mem protocols according to the CXL specification, the NMC circuitry may write results back into CXL-attached memory, which may be subsequently read by the host CPU responsive to a notification from the NMC circuitry or based on periodic polling of the CXL-attached memory by the host CPU to a memory address space reserved for storing results generated by the NMC circuitry.

Figure 5:
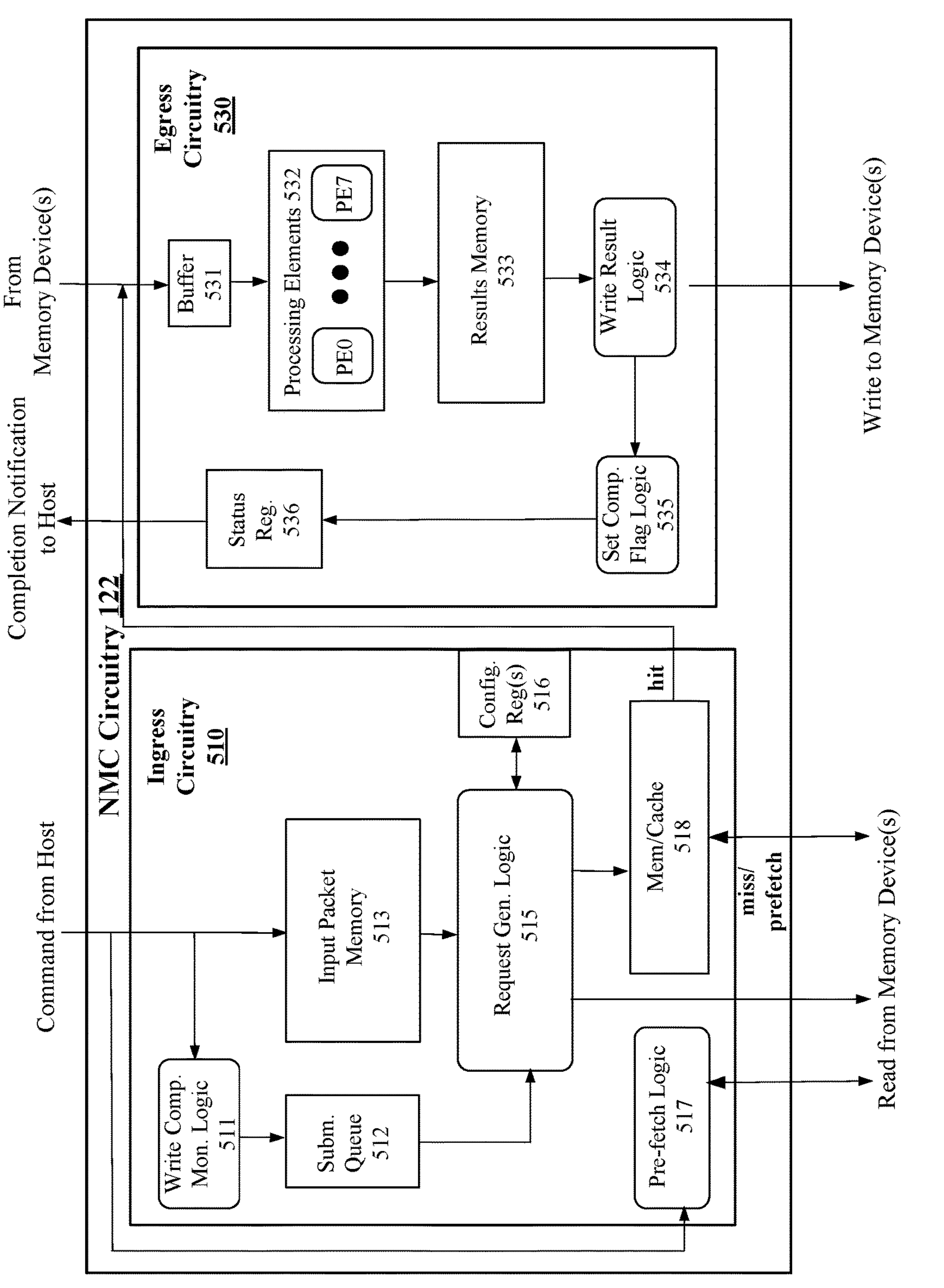
FIG. 5 illustrates example near-memory compute (NMC) circuitry.

FIG. 5 illustrates example NMC circuitry 122. According to some examples, as shown in FIG. 5, NMC circuitry 122 has two circuitry divisions shown as an ingress circuitry 510 and an egress circuitry 530. For these examples, as shown in FIG. 5, ingress circuitry 510 includes a write completion monitoring logic 511, a submission queue 512, an input packet memory 513, a request generation logic 515, one or more configuration registers 516, a pre-fetch logic 517 or a memory/cache 518. Egress circuitry 530 includes a buffer 531, processing elements 532, a partial results memory 533, write result logic 534, a set completion flag logic 535 and a status register 536.

In some examples, ingress circuitry 510 is responsible for decoding incoming command packets (e.g., using command packet format 300) from a host CPU, the incoming command packets may be at least temporarily stored in input packet memory 513. For these examples, request generation logic 515 may access base address information maintained in configuration register(s) 516 to calculate memory read addresses indicated by offset information included in received command packets and cause read commands to be sent to memory devices associated with the calculated memory read addresses. The base address information maintained in configuration register(s) 516 may be for a given CPU host and a given context. According to some examples, write completion monitoring logic 511 may manage submission queue 512 to cause request generation logic 515 to calculate memory read addresses associated with each received command packet.

According to some examples, memory/cache 518 may be configured as an on-chip cache or as a scratchpad memory depending on requirements of memory-bound AI workloads that NMC circuitry 122 may be used by a host CPU to accelerate these memory-bound AI workloads. Memory/cache 518, for example, may be a memory array (e.g., an SRAM memory array) with a few MBs of memory capacity. In an example of a search AI workload such as HNSW, a negligible benefit from on-chip/local caching may be possible. For this example, memory/cache 518 may be used to store a batch of query vectors during a period via which a host CPU uses NMC circuitry 122 for distance calculations to accelerate HNSW workloads. In another example, AI workloads associated with DLRM or GNN may benefit from on-chip caching of common vectors. For this other example, NMC circuitry 122 does not impose restrictions on a type of cache but given the random nature of memory accesses associated with DLRM or GNN type AI workloads, a set-associative cache with a least-frequently used (LFU) eviction policy may be the most useful for storing frequently used vectors for these types of AI workloads. Request generation logic 515 may first read memory/cache 518 to determine if a vector is already stored in memory/cache 518. If there is a hit for the vector (vector is stored in memory/cache 518), the data for the vector is read out from memory/cache 518. The data may be read out from memory/cache 518 with a 64 B granularity and sent for processing by processing elements 532 of egress circuitry 530. If there is a miss for the vector (vector not stored in memory/cache 518), request generation logic 515 causes a read request to be sent to a memory device and the vector read from the memory device is sent back to ingress circuitry 510 to be written to memory/cache 518.

In some examples, a number of processing elements (PEs) included in processing elements 532 may be based on a number of operations per byte of memory traffic processed. For example, the number of PEs may be dependent on a maximum of flops/4 B that is decided to be supported by an architecture for NMC circuitry 122. A typical batch size for this example is ≤8 resulting in 8 flops/4 B. In a given cycle, for example, there can be at most two 64 B data portions (e.g., 2 cache lines) available for processing by PEs included in processing elements 532, one from memory/cache 518 and another from a memory device read. A maximum # of PEs, for this example cycle, may be estimated as 2*64 B*8/4 B=256. Each PE included in processing elements 532, as described more below, may be arranged in a pipelined data path architecture.

According to some examples, intermediate results generated by processing elements 532 may be at least temporarily stored in results memory 533 for possible aggregation across multiple operating clock cycles. Result memory 533 may be a separate portion of an on-chip memory array (e.g., SRAM) that also includes a portion to support memory/cache 518 or may be a separate memory array from a memory array that supports memory/cache 518. In one example, final results generated by processing elements 532 may be written to results memory 533 by write result logic 534 for subsequent access by the requesting host CPU that requested acceleration processing for an AI workload, the requested acceleration processing associated with the final results. For this one example, write result logic 534 may indicate to set completion flag logic 535 that final results have been written to a portion of results memory 533 accessible by the requesting host CPU. Set completion flag logic 535 may then set a status register flag included in status register 536. Setting the status register flag may indicate to the requesting host CPU that final results are completed and located in the accessible portion of results memory 533. In another example, write result logic 534 may cause the final results to be written to one or more memory devices via generation of an output packet (e.g., using result packet format 400) that may be subsequently accessed by the requesting host CPU to obtain the final result.

In some examples, NMC circuitry 122 may be a field programmable gate array (FPGA) configured to include, but not limited to, the elements depicted in FIG. 5. In other examples, NMC circuitry 122 may be an application specific integrated circuit (ASIC) configured to include, but not limited to, the elements depicted in FIG. 5. In other examples, NMC circuitry may be a simple CPU such as a reduced instruction set computer (e.g., RISC-V), configured to include, but not limited to the elements depicted in FIG. 5.

FIG. 6 illustrates an example expanded PE7 view 600. According to some examples, expanded PE7 view 600 shows an expanded view of one PE included in processing elements 532 of NMC circuitry 122. As mentioned above, each PE included in processing elements 532 may be arranged in a pipelined data path architecture. An example pipelined data path architecture is shown in FIG. 6. Also shown FIG. 6 is a vector operations table 610 that shows operations that may be supported by PEs included in processing elements 532 via utilization of adders 601 and multipliers 602 included in each PE. For example, by setting multiplexors 605 in the data path, a same adder 601 and multiplier 602 may be reconfigured to perform different functions as listed in the "Function" column of vector operations table 610 associated with respective memory-bound AI workloads that include, but are not limited to, the types of AI workloads listed in the "Domain" and "Description" columns of vector operations table 610.

In some examples, PE organization for PEs included in processing elements 532 may not impose restrictions on a precision of a data path. For example, each adder 601 or multiplier 602 may be either 16-bit signed integer (int16), 16-bit floating point (fp16) or 32-bit floating point (fp32), depending on which PE format serves most of the memory-bound AI workloads for which NMC circuitry 122 may be used by a requesting host CPU for acceleration purposes.

According to some examples, voltage (V) and frequency (F) of NMC circuitry 122 may be dynamically controlled on the PEs included in processing elements 532 to improve energy-efficiency during different phases of operation. For example, instead of provisioning the # of PEs for a case where two 64 B memory lines are available (e.g., one from a memory device and the other from memory/cache 518), it is possible to design with half the # of PEs and operate the same at twice compute bandwidth by bumping up the voltage and increasing frequency from F to 2×F. This can save valuable silicon (Si) area for NMC circuitry 122. In clock cycles where data is not available from either memory/cache 518 or off-chip memories at memory devices, the V,F for the PEs can be reduced to save power. Local low-dropout based voltage control and clock squashing based frequency control may significantly improve the entry and exit latencies for high-performance and low-power states. As on-chip memory/cache 518 is likely to store vectors that span multiple cache lines (multiples of 64 B), it is possible to use burst-SRAM design which may improve read and write energies by 30%.

Figure 7:
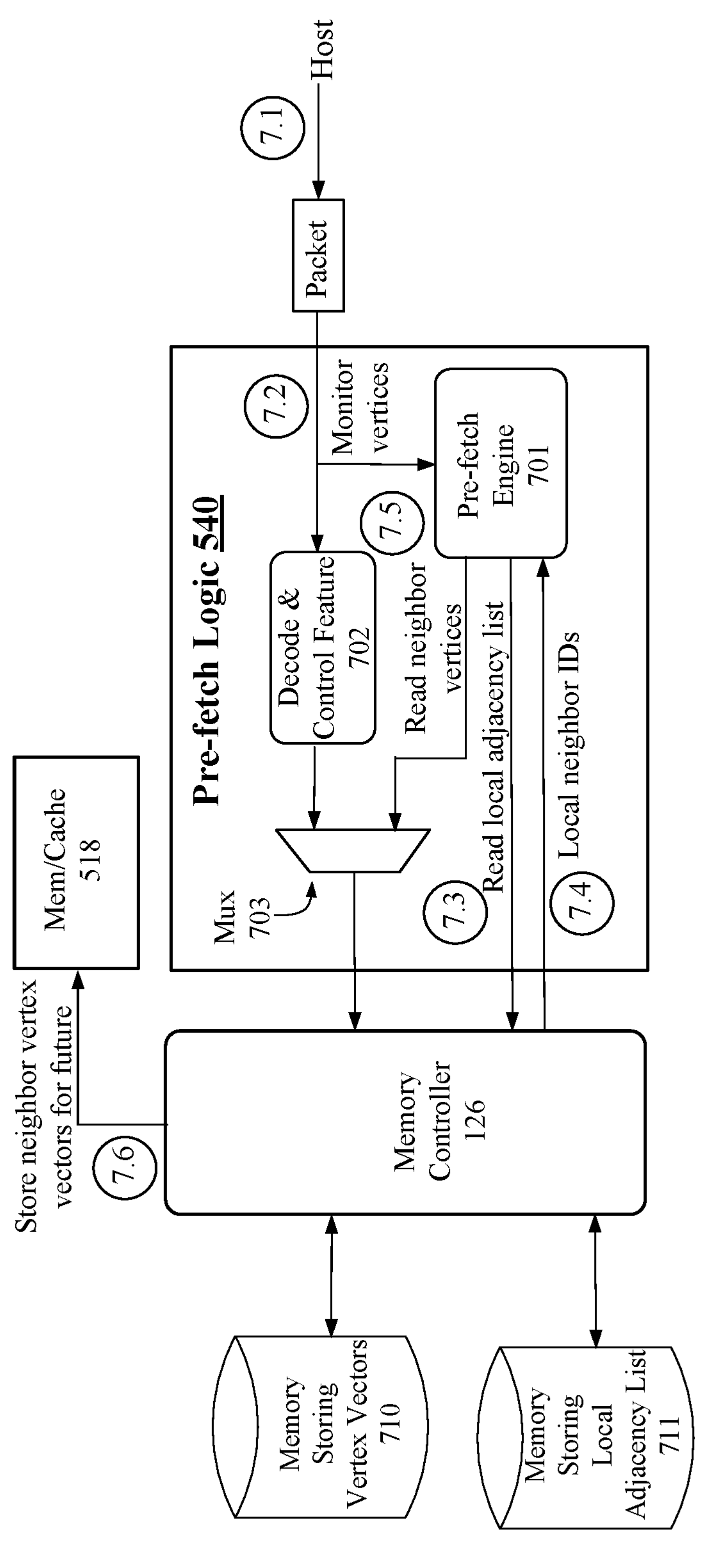
FIG. 7 illustrates an example scheme.

FIG. 7 illustrates an example scheme 700. According to some examples, scheme 700 shown in FIG. 7 depicts an example process for memory management by elements of NMC circuitry 122 that include, but are not limited to, pre-fetch logic 517 or memory/cache 518. For these examples, inclusion of memory/cache 518 in NMC circuitry 122 may allow for on-chip storage of frequently accessed data including vectors which may significantly cut down memory latency for accelerating memory-bound AI workloads that may exhibit power-law properties in their memory access. For example, memory-bound AI workloads associated with DLRM or GNN. In addition to caching of frequently accessed data including vectors in memory/cache 518, prefetching may improve performance for accelerating graph-based AI workloads such as HNSW and GNN.

According to some examples, scheme 700 begins at process 7.1 where a packet may be received from a host. The packet, for example, may be a request command packet in example command packet format 300 and may indicate a type of memory-bound AI workload to be accelerated by NMC circuitry 122. For these examples, decode & control feature 702 may decode the packet received from the host to determine what graph vertices are needed for accelerating the memory-bound AI workload. The graph vertices, for example, to be read from a memory storing vertex vectors 710 via use of memory controller 126. The memory storing vertex vectors 710 may be included, for example, in one or more memory devices from among memory devices 132 (shown in FIG. 1).

Moving to process 7.2, graph vertices may be monitored. In some examples, the graph vertices monitored may have been read from off-chip memory (e.g., from an attached CXL memory device). For these examples, pre-fetch engine 701 may monitor the graph vertices decoded by decode & control feature 702.

Moving to process 7.3, pre-fetch engine 701 may read a local adjacency list maintained in a memory storing the local adjacency list based on the monitored graph vertices. According to some examples, pre-fetch engine 701 may use memory controller 126 to access memory storing local adjacency list 711. The memory storing local adjacency list 711 may be included, for example, in a memory device from among memory devices 132. For these examples, the local adjacency list may include local neighbor IDs for which pre-fetch engine 701 may use to determine at what memory addresses via which the neighboring vertices may be read from memory storing vertex vectors 710 in order to pre-fetch data that includes these neighboring vertices. Pre-fetching of data including the neighboring vertices may be based on a high likelihood that some or most of these neighboring vertices may be needed for accelerating the AI workload in the future. Since the vertices of the graph may be distributed across multiple memory devices, a curated adjacency list may need to be stored per memory device that defines a connectivity among the vertices stored local to that memory device. This local adjacency list may reside in a same memory device that stores vertex vectors or a separate memory channel that is dedicated to storing the local adjacency list. Using a separate memory channel helps to dedicate an entire memory access bandwidth for vertex vector reading and for reading the adjacency list.

Moving to process 7.4, pre-fetch engine 701 receives the local neighbor IDs.

Moving to process 7.5, pre-fetch engine 701 uses the local neighbor IDs to cause the local neighbor vertices to be read from the memory storing vertex vectors 710. In some examples, the request to read neighbor vertices generated by pre-fetch engine 701 is multiplexed by Mux 703 with read requests generated by decode & control feature 702.

Moving to process 7.6, vertex vectors read from memory storing vertex vectors 710 that includes the read neighbor vertex vectors are stored to memory/cache 518 for possible use in the future. Scheme 700 then comes to an end.

Figure 8:
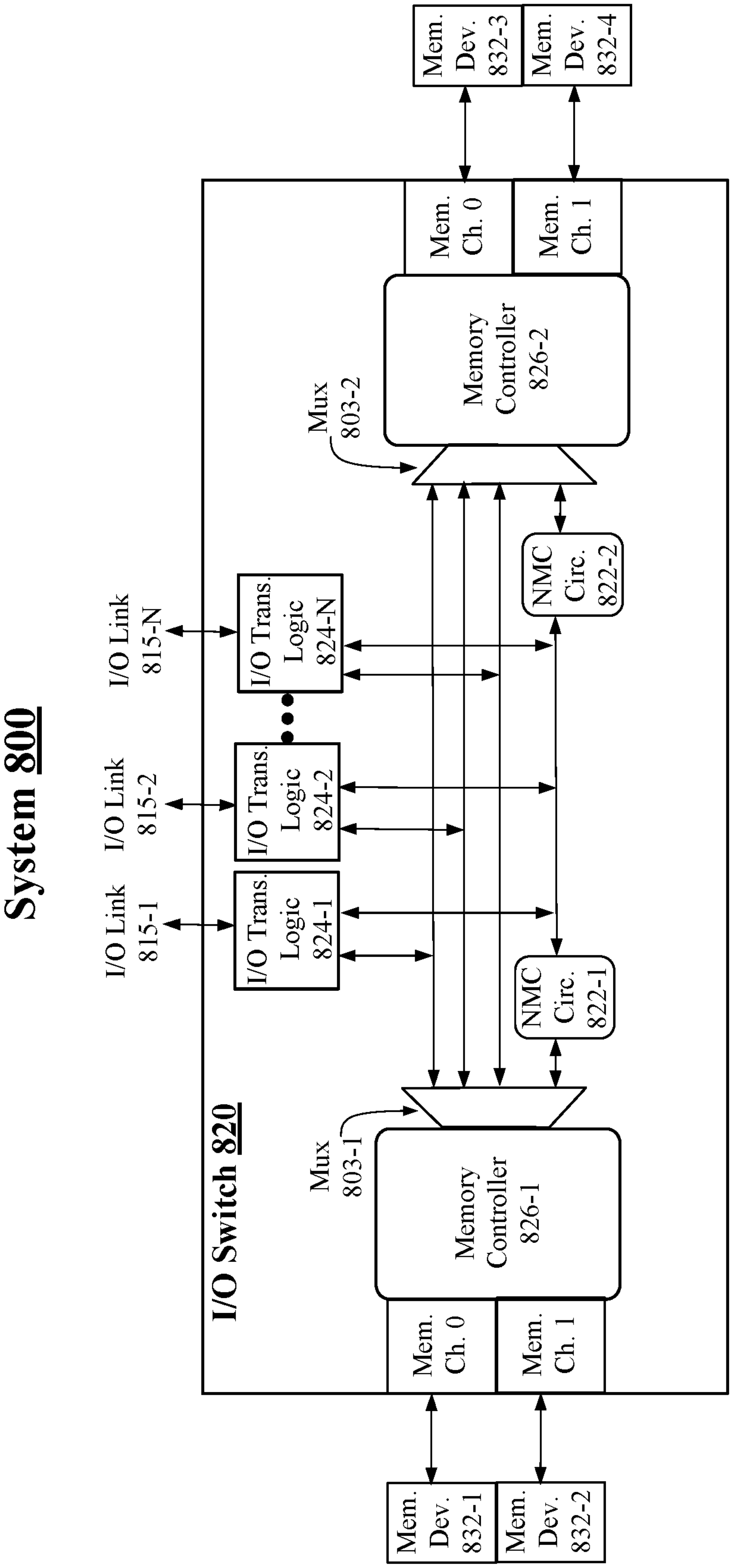
FIG. 8 illustrates an example third system.

FIG. 8 illustrates an example system 800. In some examples, system 800 shown in FIG. 8 depicts an I/O switch 820 having multiple memory controllers 826-1 and 826-2 in a same I/O switch. For these examples, NMC circuitry 822-1 and 822-2 may be associated or attached with respective memory controllers 826-1 and 826-2. Also for these examples, a memory address space associated with memory devices 832-1 to 832-4 may be equally divided between memory controllers 826-1 and 826-2 and thus allow a simple inspection of a neighbor ID/offset to allow a host CPU to send separate command packets over one of I/O links 815-1 to 815-N and through corresponding I/O transaction logic 824-1 to 824-N to reach a destination NMC circuitry 822-1 or 822-2 for aggregation of data that is local to a corresponding memory controller by the destination NMC circuitry.

According to some examples, if NMC circuitry 822-1 or 822-2 are configured as ASICs, NMC circuitry 822-1 or 822-2 may include an advanced extensible interface (AXI) master interface to couple with I/O transaction logic 824-1 to 824-N and corresponding memory controllers 826-1 or 826-2. In other examples, if NMC circuitry 822-1 or 822-2 are configured as FPGAs, NMC circuitry 822-1 or 822-2 may include an Avalon® interface to couple with I/O transaction logic 824-1 to 824-N and corresponding memory controllers 826-1 or 826-2. For either of these examples, a first request path to memory devices 832-1 and 832-2, routed through memory controller 826-1, is multiplexed using Mux 803-1 with other request paths from other agents and a second request path to memory devices 832-3 and 832-4, routed through memory controller 826-2, is multiplexed using Mux 803-2 with other request paths from other agents.

In some examples, I/O switch 820 may operate according to the CXL specification. For these examples, the various request paths routed through either memory controller 826-1 or 826-2 may include CXL.mem channels that use CXL.mem protocols. A host CPU may use these CXL.mem. channels to access CXL-connected memories included in memory devices 832-1 to 832-4. As NMC circuitry 822-1 or 822-2 may be another agent at the input to respective Mux 803-1 or Mux 803-2, memory bandwidth is only shared and latency is likely to not be added to existing CXL.mem channels.

Figure 9:
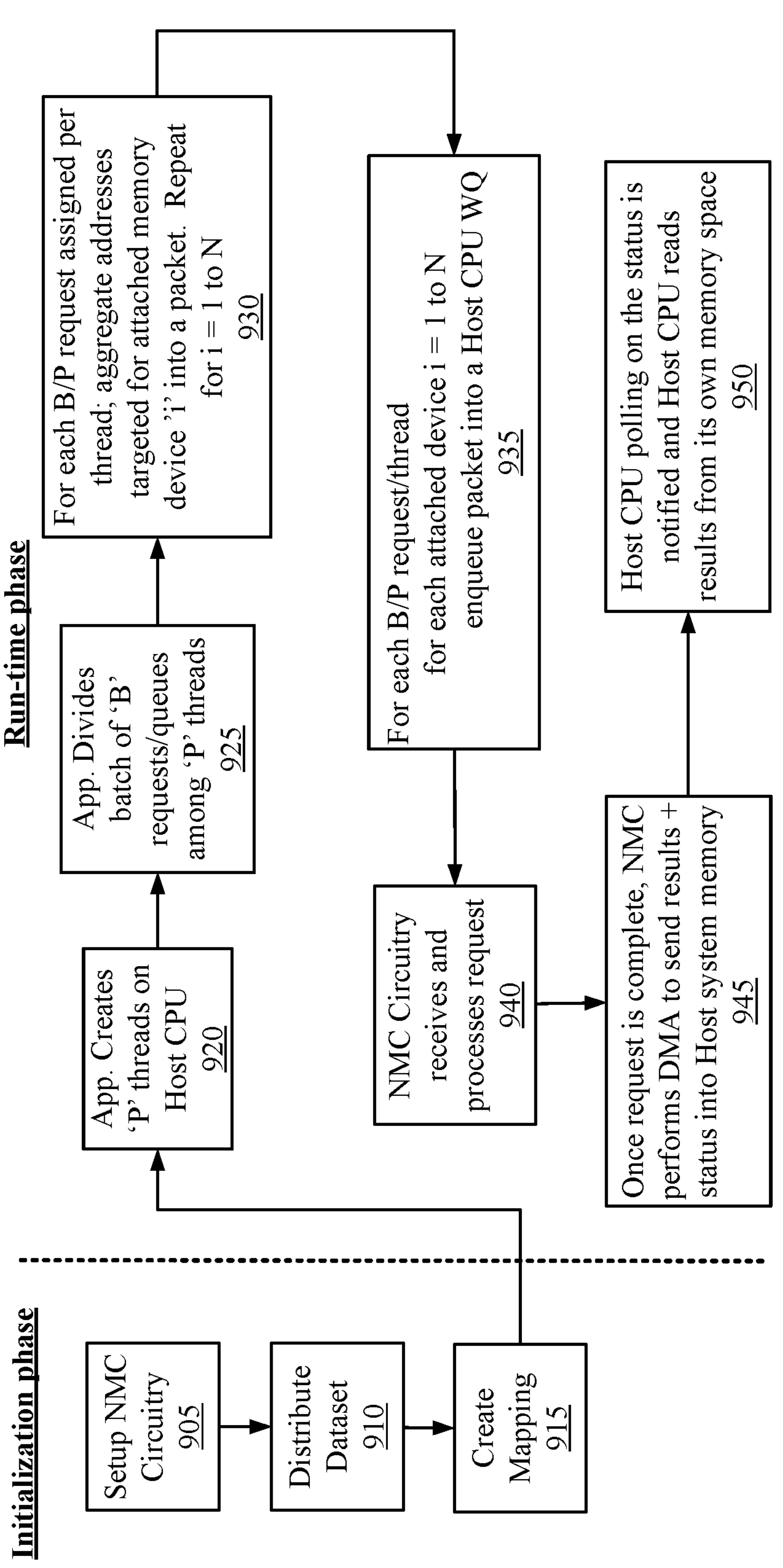
FIG. 9 illustrates an example software flow.

FIG. 9 illustrates an example software flow 900. In some examples, software flow 900 shows an initialization phase and run-time phase for offloading memory bound kernels to NMC circuitry (e.g., NMC circuitry 122) in an I/O switch (e.g., I/O switch 120). For these examples, application programming interface (API) calls running on a host CPU (e.g., host CPU 111) may be used to offload the memory bound kernels to the NMC circuitry. The initialization phase may occur when a data set is uniformly distributed among memory devices (e.g., CXL-attached memory devices). The run-time phase may occur when the host CPU sends command packets (e.g., using command packet format 300) that include memory addresses of the memory devices and the NMC circuitry responds back (e.g., using a response packet format 400) to the command packets with an aggregated vector/distance value for vectors read from those memory addresses.

Beginning at block 905, NMC circuitry may be setup and configured. For example, on-chip memory may be configured for anticipated types of AI workloads that may be accelerated by the NMC circuitry and operating frequencies for processing elements may be set.

Moving to block 910, a dataset may be distributed across "N" memory devices coupled to the I/O switch that includes the NMC circuitry. The data set, for example, may be uniformly distributed as a read-only data set that may include, but is not limited to, an embedding table, feature vectors, etc.

Moving to block 915, a logical address to node/physical address mapping for corresponding host CPUs may be created. According to some examples, configuration registers may be set to establish base address information for reading to memory addresses included in command packets from corresponding host CPUs as part of completing the node/physical address mapping.

Moving to block 920, as the first flow in the run-time phase, an application creates 'P' threads on a host CPU, where P represents any whole, positive integer.

Moving to block 925, the application logic divides batch of 'B' requests/queues among 'P' threads, where B represents any whole, positive integer greater than 1. According to some examples, the requests may be associated with acceleration requests to use the NMC circuitry for memory-bound AI workloads.

Moving to block 930, for each B/P request assigned per thread; the application may aggregate addresses targeted for attached memory device 'i' into a packet. Repeat for i=1 to N.

Moving to block 935, the application may for each B/P request/thread; for each attached device i=1 to N, cause a command packet to be enqueued into a host CPU work queue (WQ). In some examples, the host CPU WQ may be used for enqueuing command packets to be sent to the NMC circuitry.

Moving to block 940, NMC circuitry receives and processes the request in the command packet from the host CPU.

Moving to block 945, once the request is complete, NMC circuitry may perform a direct memory access to system memory of the host CPU to send results+status into host system memory.

Moving to block 950, the host CPU polling on the status of the request is notified about completion of the request and the host CPU then reads results from its own memory space within system memory. Software flow 900 then comes to an end.

According to some examples, memory-bound AI workloads related to similarity search may be accelerated by NMC circuitry in an I/O switch such as NMC circuitry 122, 222, 822-1 or 822-2 shown in FIGS. 1, 2 and 8. For example, for modeling similarity search based on HNSW, an assumption of 512 B is made for each feature vector and query vector stored in an attached memory device. The average # of neighbors for each vertex in the HNSW graph is assumed to be 64 and the total # of vector distance calculations for each query vector with vertices in the graph across all iterations is on an average 5,000. In a baseline case that does not involve use of NMC circuitry, all HNSW functions such as distance calculation between feature vectors read from the attached memory device, sorting of distances and graph traversal based on the nearest neighbor at each step of iteration is done by a host CPU. However, when using NMC circuitry for acceleration, the distance calculation kernel for the HNSW workload is offloaded to the NMC circuitry, as it results in 512/4=128× reduction in data traffic over an I/O transaction link between the host CPU and the attached memory devices, thus relieving a memory bandwidth bottleneck. In the above equation, 512 B is the size of each vector and 4 B is the size of the distance value. The rest of HNSW functions, such as sorting and graph traversal may still be performed on the host CPU. Due to the random nature of memory access, the vector fetch portion of this type of memory-bound AI workload contributes to the longest latency for each iteration. Spreading the data across memories connected to a single attached memory device as well as across multiple attached memory devices improves the time required to fetch the neighbors for a single vertex, resulting in overall 2.55× throughput (measured as queries per second or QPS) improvement when 8 attached memory devices are used and when those 8 attached memory and the I/O switch operate according to the CXL specification.

In some examples, memory-bound AI workloads related to sparse-length-sum (SLS) may be accelerated by NMC circuitry in an I/O switch such as NMC circuitry 122, 222, 822-1 or 822-2 shown in FIGS. 1, 2 and 8. For example, a kernel that involves reading vectors from an embedding table and aggregating them through mean/max/min pooling. Similar steps also appear in GNN for aggregating the vectors of the neighboring vertices of a given vertex. Input to the memory-bound kernel is a list of indices with which the embedding table is accessed. In one example calculation, an assumption of an average 120 accesses to occur to each embedding table and on average 32 such tables per recommendation model may result for a batch size of 16. Vectors read out from an embedding table are pooled resulting in 120× data movement reduction across an I/O transaction interface such as an CXL interface. By distributing this parallelism among N attached memory devices (say N=8) with the use of NMC circuitry, and each NMC circuitry supporting up to 256 parallel threads, it is possible to deliver 2.6× improvement with higher memory bandwidth and more parallel aggregation across 8 attached memory devices and when those 8 attached memory and the I/O switch operate according to the CXL specification.

According to some examples, memory-bound AI workloads related to matrix-vector/low-batch matrix multiplication may be accelerated by NMC circuitry in an I/O switch such as NMC circuitry 122, 222, 822-1 or 822-2 shown in FIGS. 1, 2 and 8. For example, matrix-vector (MV) and low-batch matrix-matrix multiplication appear in the fullyconnected layers of workloads executed by types of accelerator-in-memory architectures. MV operations are completely memory bound and as the batch size increases the problem becomes more compute bound. For small batch sizes (<=8), the problem is still primarily memory bound. For example, the matrix contains weights for a type of model such as DNN and is expected to be distributed across multiple attached memory devices for NMC circuitry to exploit higher memory bandwidth for MV multiplication. A performance improvement for using NMC circuitry is exactly equal to the memory bandwidth improvement as compared to a baseline which is 2.7× in this example.

Figure 10:
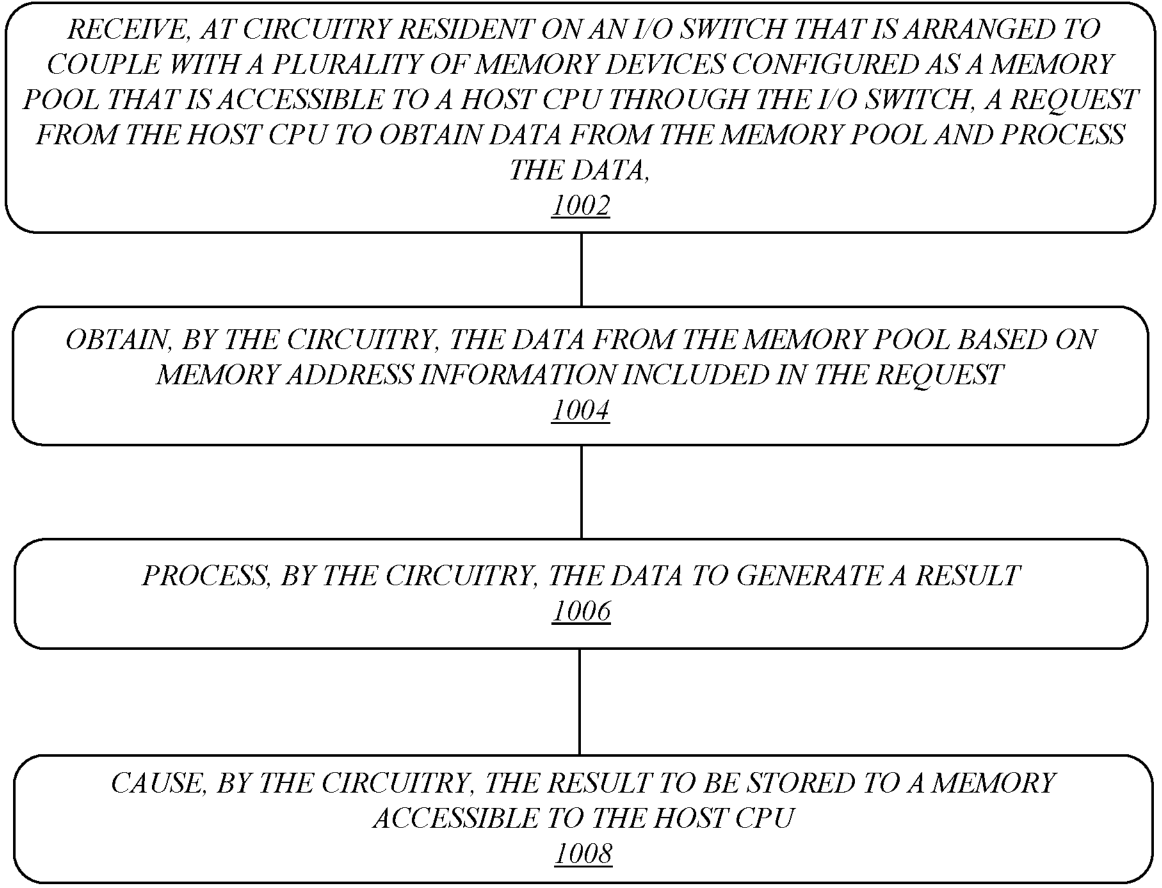
FIG. 10 illustrates an example logic flow.

FIG. 10 illustrates an example of a logic flow 1000. Logic flow 1000 may be representative of some or all of the operations executed by one or more logic, features, or devices described herein, such as logic and/or features included in NMC circuitry 122. More particularly, logic flow 1000 may be implemented by logic and/or features of ingress circuitry 510 or egress circuitry 530 of NMC circuitry 122 as shown in FIG. 5 and described above. For these examples, NMC circuitry 122 may be NMC circuitry 122-1 that is shown in FIG. 1 as resident on I/O switch 120-1 that couples to host CPU 111 and to a plurality of memory devices that includes memory devices 132-1 to 132-6. Memory devices 132-1 to 132-6, as shown in FIG. 1, are included in memory pool 130-1. Memory pool 130-1 may be accessible to host CPU 111 and NMC circuitry 122-1.

According to some examples, as shown in FIG. 10, logic flow 1000 at block 1002 may receive, at circuitry resident on an I/O switch that is arranged to couple with a plurality of memory devices configured as a memory pool that is accessible to a host CPU through the I/O switch, a request from the host CPU to obtain data from the memory pool. For these example, ingress circuitry 510 resident may receive the request via a command packet from host CPU 111.

In some examples, logic flow 1000 at block 1004 may obtain, by the circuitry, the data from the memory pool based on memory address information included in the request. For these examples, request generation logic 515 of ingress circuitry 510 may generate a request to one or more memory devices included in memory pool 130-1 to obtain the data from memory pool 130-1 based on the memory address information included in the request. The data may be at least temporarily stored in memory/cache 518 of ingress circuitry 510 once the data is obtained from memory pool 130-1.

According to some examples, logic flow 1000 at block 1006 may process, by the circuitry, the data to generate a result. For these examples, processing elements 532 of egress circuitry 530 may pull the obtained data temporarily stored to memory/cache 518 and then process the data to generate a result. The generated result may be at least temporarily stored to results memory 533 of egress circuitry 530.

In some examples, logic flow 1000 at block 1008 may cause, by the circuitry, the result to be stored to a memory accessible to the host CPU. For these examples, write result logic 534 of egress circuitry 530 may pull the generated result from results memory 533 and cause the result to be stored to a memory accessible to host CPU 111. The memory accessible to host CPU 111 may be located local/on-chip to NMC circuitry 122-1, may be located in memory pool 130-1, or may be located in a host memory space for host CPU 111 that is separate from memory space included in memory pool 130-1.

The software or logic flows shown in FIGS. 9 and 10 may be representative of example methodologies for performing novel aspects described in this disclosure. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic or software flow may be implemented in software, firmware, and/or hardware. In software and firmware embodiments, a software or logic flow may be implemented by computer executable instructions stored on at least one non-transitory computer readable medium or machine readable medium, such as an optical, magnetic or semiconductor storage. The embodiments are not limited in this context.

Figure 11:
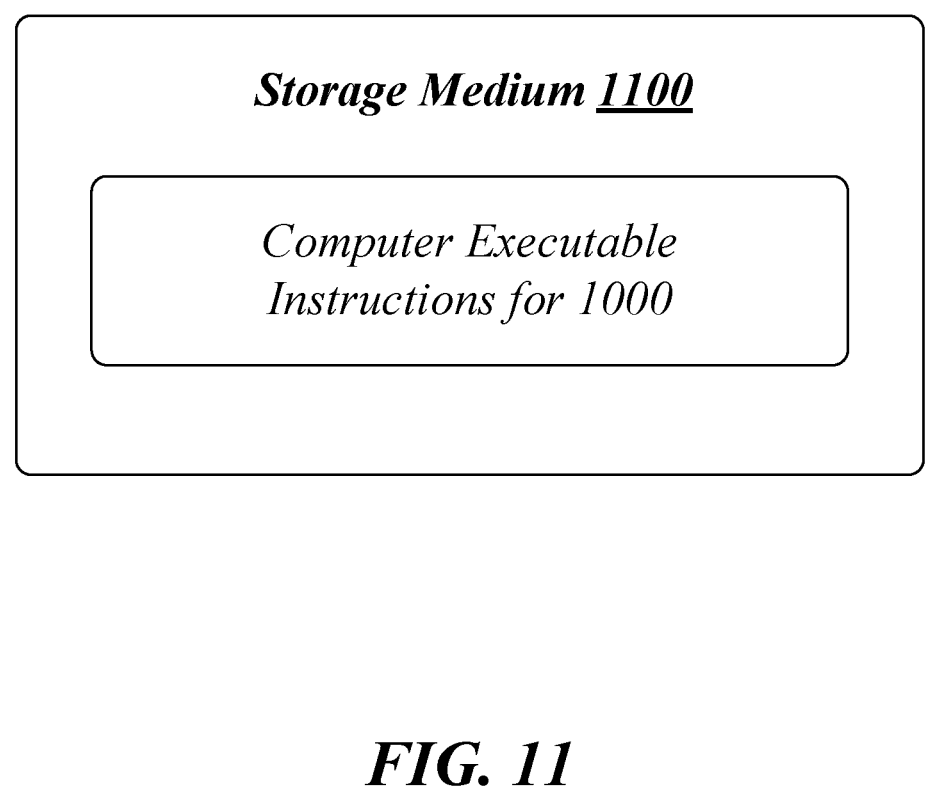

FIG. 11 illustrates an example of a storage medium 1100. Storage medium 1100 may comprise an article of manufacture. In some examples, storage medium 1100 may include any non-transitory computer readable medium or machine readable medium, such as an optical, magnetic or semiconductor storage. Storage medium 1100 may store various types of computer executable instructions, such as instructions to implement logic flow 1000. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

One or more aspects of at least one example may be implemented by representative instructions stored on at least one machine-readable medium which represents various logic within a processor, processor circuit, ASIC, or FPGA which when read by a machine, computing device or system causes the machine, computing device or system to fabricate logic to perform the techniques described herein. Such representations may be stored on a tangible, machine readable medium and supplied to various customers or manufacturing facilities to load into the fabrication machines that actually make the processor, processor circuit, ASIC, or FPGA.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The following examples pertain to additional examples of technologies disclosed herein.

Example 1. An example apparatus may include circuitry resident on an I/O switch. The I/O switch may be arranged to couple with a plurality of memory devices configured as a memory pool that is accessible to a host CPU through the I/O switch. For this example, the circuitry may receive a request from the host CPU to obtain data from the memory pool and process the data. The circuitry may also obtain the data from the memory pool based on memory address information included in the request. The circuitry may also process the data to generate a result; and cause the result to be stored to a memory accessible to the host CPU.

Example 2. The apparatus of example 1, wherein the request from the host CPU may be to accelerate execution of a workload of the host CPU. The workload may include a HNSW workload, a DLRM workload, a GNN workload, or a low-batch matrix-matrix multiplication workload.

Example 3. The apparatus of example 1, the circuitry may obtain the data from the memory pool using a memory controller that is also resident on the I/O switch.

Example 4. The apparatus of example 1, wherein to obtain the data from the memory pool may further include the circuitry to pre-fetch at least a portion of the data to a cache memory that is local to the circuitry and separate from memory included in the memory pool. The at least a portion of the data may be pre-fetched to the cache memory based on a previous request to obtain and process data received from the host CPU.

Example 5. The apparatus of example 4, the I/O switch may be configured to operate as a CXL switch. For this example, the circuitry may pre-fetch the at least a portion of the data from the memory pool using CXL.mem protocols.

Example 6. The apparatus of example 1, the circuitry and the I/O switch may be resident on a device that also includes the plurality of memory devices configured as the memory pool.

Example 7. The apparatus of example 5, the plurality of memory devices may be a first portion of memory devices including volatile types of memory and a second portion of memory devices including non-volatile types of memory.

Example 8. The apparatus of example 1, the I/O switch may be configured to operate as a CXL switch.

Example 9. The apparatus of example 8, the circuitry to cause the result to be stored to the memory accessible to the host CPU may include the circuitry to cause the results to be stored to a memory that is local to the circuitry and separate from memory included in the memory pool. For this example, the circuitry is further to indicate to the host CPU via use of CXL.io protocols that the results have been stored in the memory that is local to the circuitry.

Example 10. The apparatus of example 8, the circuitry to cause the result to be stored to the memory accessible to the host CPU may also include the circuitry to cause the results to be stored to a memory for the host CPU that is separate from the memory pool. For this example, the circuitry may also indicate to the host CPU via use of CXL.cache protocols that the results have been stored in the memory for the host CPU.

Example 11. The apparatus of example 8, the circuitry to cause the result to be stored to the memory accessible to the host CPU may include the circuitry to cause the results to be stored to a memory included in the memory pool. For this example the circuitry may also indicate to the host CPU via use of CXL.mem protocols that the results have been stored in the memory included in the memory pool.

Example 12. An example method may include receiving, at circuitry resident on an I/O switch that is arranged to couple with a plurality of memory devices configured as a memory pool that is accessible to a host CPU through the I/O switch, a request from the host CPU to obtain data from the memory pool and process. The method may also include obtaining, by the circuitry, the data from the memory pool based on memory address information included in the request. The method may also include processing, by the circuitry, the data to generate a result. The method may also include causing, by the circuitry, the result to be stored to a memory accessible to the host CPU.

Example 13. The method of example 12, the request from the host CPU may be to accelerate execution of a workload of the host CPU. The workload may include a HNSW workload, a DLRM workload, a GNN workload, or a low-batch matrix-matrix multiplication workload.

Example 14. The method of example 12, obtaining the data from the memory pool may include using a memory controller that is also resident on the I/O switch.

Example 15. The method of example 12, obtaining the data from the memory pool may also include pre-fetching at least a portion of the data to a cache memory that is local to the circuitry and separate from memory included in the memory pool. The at least a portion of the data may be pre-fetched to the cache memory based on a previous request to obtain and process data received from the host CPU.

Example 16. The method of example 15, the I/O switch may be configured to operate as a CXL switch. For this example pre-fetching the at least a portion of the data from the memory pool includes using CXL.mem protocols for pre-fetching the at least a portion of the data.

Example 17. The method of example 12, the circuitry and the I/O switch may be resident on a device that also includes the plurality of memory devices configured as the memory pool.

Example 18. The method of example 17, the plurality of memory devices may be a first portion of memory devices including volatile types of memory and a second portion of memory devices including non-volatile types of memory.

Example 19. The method of example 12, the I/O switch may be configured to operate as a CXL switch.

Example 20. The method of example 19, causing the result to be stored to the memory accessible to the host CPU may include causing the results to be stored to a memory that is local to the circuitry and separate from memory included in the memory pool. For this example, the method may also include indicating, by the circuitry, to the host CPU via use of CXL.io protocols that the results have been stored in the memory that is local to the circuitry.

Example 21. The method of example 19, causing the result to be stored to the memory accessible to the host CPU may include causing the results to be stored to a memory for the host CPU that is separate from the memory pool. For this example, the method may also include indicating, by the circuitry, to the host CPU via use of CXL.cache protocols that the results have been stored in the memory for the host CPU.

Example 22. The method of example 19, causing the result to be stored to the memory accessible to the host CPU may include causing the results to be stored to a memory included in the memory pool. For this example, the method may also include indicating, by the circuitry, to the host CPU via use of CXL.mem protocols that the results have been stored in the memory included in the memory pool.

Example 23. An example at least one machine readable medium may include a plurality of instructions that in response to being executed by circuitry may cause the circuitry to carry out a method according to any one of examples 12 to 22.

Example 24. An example apparatus may include means for performing the methods of any one of examples 12 to 22.

Example 25. An example system may include an I/O switch arranged to couple with a plurality of memory devices. A first portion of the plurality of memory devices may be configured in a first memory pool and a second portion of the plurality of memory devices may be configured in a second memory pool. The first and second memory pools may be accessible to one or more host CPUs through the I/O switch. The system may also include a first circuitry and a first memory controller resident on the I/O switch, the first circuitry to access the first memory pool using the first memory controller. The system may also include a second circuitry and a second memory controller resident on the I/O switch, the second circuitry to access the second memory pool using the second memory controller. For this example, the second circuitry may receive a request from a first host CPU to obtain data from the second memory pool and process the data. The second circuitry may also obtain the data from the second memory pool based on memory address information included in the request from the first host CPU. The second circuitry may also process the data to generate a result for the first host CPU. The second circuitry may also cause the result for the first host CPU to be stored to a memory accessible to the first host CPU.

Example 26. The system of example 25, the first circuitry may receive a request from a second host CPU to obtain data from the first memory pool and process the data. The first circuitry may also obtain the data from the first memory pool based on memory address information included in the request from the second host CPU. The first circuitry may also process the data to generate a result for the second host CPU. The first circuitry may also cause the result for the second host CPU to be stored to a memory accessible to the second host CPU.

Example 27. The system of example 26, the separate requests from the first and second host CPUs may be to accelerate execution of respective workloads of the first and second host CPUs. The respective workloads may include a HNSW workload, a DLRM workload, a GNN workload, or a low-batch matrix-matrix multiplication workload.

Example 28. The system of example 25, to obtain the data from the second memory pool may include the second circuitry to pre-fetch at least a portion of the data to a cache memory that is local to the second circuitry and separate from memory included in the second memory pool. The at least a portion of the data may pre-fetched to the cache memory based on a previous request to obtain and process data received from the first host CPU.

Example 29. The system of example 28, the I/O switch may be configured to operate as a CXL switch. For this example, the second circuitry may pre-fetch the at least a portion of the data from the second memory pool using CXL.mem protocols.

Example 30. The system of example 25, the first circuitry, the second circuitry and the I/O switch may be resident on a device that also includes the plurality of memory devices.

Example 31. The system of example 30, the plurality of memory devices may include a first portion of memory devices including volatile types of memory and a second portion of memory devices including non-volatile types of memory.

Example 32. The system of example 25, the I/O switch may be configured to operate as a CXL switch.

Example 33. The system of example 32, the second circuitry to cause the result for the first host CPU to be stored to the memory accessible to the first host CPU may include the second circuitry to cause the results for the first host CPU to be stored to a memory that is local to the second circuitry and separate from memory included in the second memory pool. For this example, the second circuitry may also indicate to the first host CPU via use of CXL.io protocols that the results for the first host CPU have been stored in the memory that is local to the second circuitry.

Example 34. The system of example 32, the second circuitry to cause the result for the first host CPU to be stored to the memory accessible to the first host CPU may include the second circuitry to cause the results for the first host CPU to be stored to a memory for the first host CPU that is separate from the second memory pool. For this example, the second circuitry may also indicate to the second host CPU via use of CXL.cache protocols that the results for the first host CPU have been stored in the memory for the first host CPU.

Example 35. The system of example 32, the second circuitry to cause the result for the first host CPU to be stored to the memory accessible to the first host CPU may include the second circuitry to cause the results for the first host CPU to be stored to a memory included in the second memory pool. For this example, the second circuitry may also indicate to the first host CPU via use of CXL.mem protocols that the results for the first host CPU have been stored in the memory included in the second memory pool.

It is emphasized that the Abstract of the Disclosure is provided to comply with 37 C.F.R. Section 1.72 (b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claim

What is claimed is:

1. A system comprising:

an input/output (I/O) switch arranged to couple with a plurality of memory devices, a first portion of the plurality of memory devices configured in a first memory pool and a second portion of the plurality of memory devices configured in a second memory pool, the first and second memory pools accessible to one or more host central processing units (CPUs) through the I/O switch;

a first circuitry and a first memory controller resident on the I/O switch, the first circuitry to access the first memory pool using the first memory controller;

a second circuitry and a second memory controller resident on the I/O switch, the second circuitry to access the second memory pool using the second memory controller, wherein the second circuitry is to:

receive a request from a first host CPU to obtain data from the second memory pool and process the data;

obtain the data from the second memory pool based on memory address information included in the request from the first host CPU;

process the data to generate a result for the first host CPU; and cause the result for the first host CPU to be stored to a memory accessible to the first host CPU.

2. The system of claim 1, wherein the first circuitry is to:

receive a request from a second host CPU to obtain data from the first memory pool and process the data;

obtain the data from the first memory pool based on memory address information included in the request from the second host CPU;

process the data to generate a result for the second host CPU; and cause the result for the second host CPU to be stored to a memory accessible to the second host CPU.

3. The system of claim 2, wherein the separate requests from the first and second host CPUs are to accelerate execution of respective workloads of the first and second host CPUs, the respective workloads to include a hierarchical navigable small worlds (HNSW) workload, a deep learning recommendation model (DLRM) workload, a graph neural networks (GNN) workload, or a low-batch matrix-matrix multiplication workload.

4. The system of claim 2, comprising the I/O switch configured to operate as a Compute Express Link (CXL) switch, wherein the second circuitry to cause the result for the first host CPU to be stored to the memory accessible to the first host CPU includes the second circuitry to cause the results for the first host CPU to be stored to a memory that is local to the second circuitry and separate from memory included in the second memory pool, wherein the second circuitry is further to:

indicate to the second host CPU via use of CXL.cache protocols that the results for the first host CPU have been stored in the memory for the first host CPU.

5. The system of claim 1, wherein to obtain the data from the second memory pool further includes the second circuitry to pre-fetch at least a portion of the data to a cache memory that is local to the second circuitry and separate from memory included in the second memory pool, the at least a portion of the data pre-fetched to the cache memory based on a previous request to obtain and process data received from the first host CPU.

6. The system of claim 1, comprising the first circuitry, the second circuitry and the I/O switch are resident on a device that also includes the plurality of memory devices, wherein the plurality of memory devices include a first portion of memory devices arranged to include volatile types of memory and a second portion of memory devices arranged to include non-volatile types of memory.

7. The system of claim 1, comprising the I/O switch configured to operate as a Compute Express Link (CXL) switch, wherein the second circuitry to cause the result for the first host CPU to be stored to the memory accessible to the first host CPU includes the second circuitry to cause the results for the first host CPU to be stored to a memory included in the second memory pool, wherein the second circuitry is further to:

indicate to the first host CPU via use of CXL.mem protocols that the results for the first host CPU have been stored in the memory included in the second memory pool.

8. A method comprising:

receiving a request at first circuitry resident on an input/output (I/O) switch that is arranged to couple with a plurality of memory devices configured in a first memory pool and a second portion of the plurality of memory devices configured in a second memory pool, the first and second memory pools accessible to one or more host central processing units (CPUs) through the I/O switch, wherein the I/O switch also has a first memory controller to enable the first circuitry to access the first memory pool and also includes a second circuitry and a second memory controller resident on the I/O switch, the second memory controller to enable the second circuitry to access the second memory pool, and wherein the request is received from a first host CPU for obtaining data from the first memory pool and for processing the obtained data;

obtaining, by the first circuitry, the data from the first memory pool based on memory address information included in the request from the first host CPU;

processing, by the first circuitry, the data to generate a result for the first host CPU; and cause, by the first circuitry, the result for the first host CPU to be stored to a memory accessible to the first host CPU.

9. The method of claim 8, further comprising:

receiving, at the second circuitry, a request from a second host CPU for obtaining data from the second memory pool and processing the data obtained from the second memory pool;

obtaining, by the first circuitry, the data from the second memory pool based on memory address information included in the request from the second host CPU;

processing, by the first circuitry, the data to generate a result for the second host CPU; and causing, by the first circuitry, the result for the second host CPU to be stored to a memory accessible to the second host CPU.

10. The method of claim 9, wherein the separate requests from the first and second host CPUs are to accelerate execution of respective workloads of the first and second host CPUs, the respective workloads to include a hierarchical navigable small worlds (HNSW) workload, a deep learning recommendation model (DLRM) workload, a graph neural networks (GNN) workload, or a low-batch matrix-matrix multiplication workload.

11. The method of claim 9, comprising the I/O switch configured to operate as a Compute Express Link (CXL) switch, wherein the first circuitry causing the result for the first host CPU to be stored to the memory accessible to the first host CPU includes the first circuitry causing the results for the first host CPU to be stored to a memory that is local to the first circuitry and separate from memory included in the first memory pool, wherein the method further comprises:

indicating to the second host CPU, by the first circuitry, via use of CXL.cache protocols that the results for the first host CPU have been stored in the memory for the first host CPU.

12. The method of claim 8, wherein obtaining the data from the first memory pool further includes the first circuitry to pre-fetch at least a portion of the data to a cache memory that is local to the first circuitry and separate from memory included in the first memory pool, the at least a portion of the data pre-fetched to the cache memory based on a previous request to obtain and process data received from the first host CPU.

13. The method of claim 8, comprising the first circuitry, the second circuitry and the I/O switch are resident on a device that also includes the plurality of memory devices, wherein the plurality of memory devices include a first portion of memory devices arranged to include volatile types of memory and a second portion of memory devices arranged to include non-volatile types of memory.

14. The method of claim 8, comprising the I/O switch configured to operate as a Compute Express Link (CXL) switch, wherein the first circuitry causing the result for the first host CPU to be stored to the memory accessible to the first host CPU includes the first circuitry causing the results for the first host CPU to be stored to a memory included in the first memory pool, wherein the method further comprises:

indicating to the first host CPU, by the first circuitry, via use of CXL.mem protocols that the results for the first host CPU have been stored in the memory included in the first memory pool.

* * * * *